United States Patent
Shi et al.

(10) Patent No.: US 10,901,554 B2
(45) Date of Patent: Jan. 26, 2021

(54) TERMINAL, METHOD AND DEVICE FOR RECOGNIZING OBSTACLE, AND STORAGE MEDIUM

(71) Applicant: BEIJING XIAOMI MOBILE SOFTWARE CO., LTD., Beijing (CN)

(72) Inventors: Runyu Shi, Beijing (CN); Jinlong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/688,913

(22) Filed: Nov. 19, 2019

(65) Prior Publication Data

US 2020/0387284 A1    Dec. 10, 2020

(30) Foreign Application Priority Data

Jun. 6, 2019    (CN) .......................... 2019 1 0493224

(51) Int. Cl.
| | |
|---|---|
| *G06F 3/041* | (2006.01) |
| *G01S 15/46* | (2006.01) |
| *G06F 3/044* | (2006.01) |
| *G01P 15/00* | (2006.01) |

(52) U.S. Cl.
CPC .......... *G06F 3/04186* (2019.05); *G01S 15/46* (2013.01); *G06F 3/044* (2013.01); *G01P 15/00* (2013.01)

(58) Field of Classification Search
CPC ...... G06F 3/044; G06F 3/04186; G01S 15/46; G01P 15/00
See application file for complete search history.

(56) References Cited

U.S. PATENT DOCUMENTS

| | | | |
|---|---|---|---|
| 10,502,442 B2* | 12/2019 | Guan | H05B 47/11 |
| 2007/0121097 A1* | 5/2007 | Boillot | G01S 15/42 356/28 |
| 2013/0176264 A1 | 7/2013 | Alameh et al. | |
| 2014/0071069 A1* | 3/2014 | Anderson | A63F 13/06 345/173 |
| 2014/0282224 A1* | 9/2014 | Pedley | G06F 3/0485 715/784 |
| 2015/0375947 A1* | 12/2015 | Hochstein | B65G 69/2882 348/143 |
| 2019/0156496 A1* | 5/2019 | Leduc | G06K 9/00771 |
| 2020/0245423 A1* | 7/2020 | Honjo | H05B 47/105 |

OTHER PUBLICATIONS

Extended European Search Report for EP application 19217896.0, dated Jun. 26, 2020.

* cited by examiner

*Primary Examiner* — Muhammad N Edun
(74) *Attorney, Agent, or Firm* — Syncoda LLC; Feng Ma

(57) ABSTRACT

A method for recognizing an obstacle includes: acquiring a first dynamic parameter of the terminal at a current moment; acquiring a second dynamic parameter of the terminal at the current moment; and performing motion analysis on the obstacle based on the first dynamic parameter and the second dynamic parameter, to obtain an event recognition result of the obstacle.

17 Claims, 11 Drawing Sheets

TERMINAL, METHOD AND DEVICE FOR RECOGNIZING OBSTACLE, AND STORAGE MEDIUM

CROSS-REFERENCE TO RELATED APPLICATION

This application claims priority to Chinese Patent Application No. 201910493224.3, filed on Jun. 6, 2019, the disclosure of which is hereby incorporated by reference in its entirety.

BACKGROUND

Mobile terminals often are provided with a touch screen. Taking a smart phone as an example, to prevent accidental touch while the user is speaking over the phone, the touch screen can be set to automatically turn off when the user's face approaches the touch screen, and automatically turn on when the user's face is away from the touch screen.

SUMMARY

Various embodiments of the present disclosure relate to the field of electronic devices, and more specifically to a terminal for recognizing an obstacle, a method and a device for recognizing an obstacle, and a storage medium.

According to an aspect of the present disclosure, a terminal for recognizing an obstacle is provided. The terminal includes a motion sensor, an ultrasonic sensor, and a processor, and the motion sensor and the ultrasonic sensor are electrically coupled to the processor. The motion sensor is configured to acquire a first dynamic parameter of the terminal. The ultrasonic sensor is configured to acquire a second dynamic parameter of the terminal. The processor is configured to perform motion analysis on the obstacle based on the first dynamic parameter and the second dynamic parameter, to obtain an event recognition result of the obstacle.

According to another aspect of the present disclosure, a method for recognizing an obstacle is provided. The method may include: acquiring a first dynamic parameter of the terminal at a current moment; acquiring a second dynamic parameter of the terminal at the current moment; and performing motion analysis on the obstacle based on the first dynamic parameter and the second dynamic parameter, to obtain an event recognition result of the obstacle.

BRIEF DESCRIPTION OF THE DRAWINGS

In order to clearly illustrate technical solutions of embodiments of the present disclosure, a brief description of drawings used in embodiments is given below. The drawings in the following descriptions are only some embodiments of the present disclosure, and for those of ordinary skill in the art, other drawings can be obtained according to these drawings without creative efforts.

DETAILED DESCRIPTION

In order to make the objectives, technical solutions and benefits of the present disclosure clearer, embodiments of the present disclosure will be further described in detail below with reference to the accompanying drawings.

The top of the front panel of the smart phone can be provided with an infrared sensor, which is configured to sense the user's position to thereby automatically turn off or turn on the touch screen. With the development of full-screen mobile phones, the setting of the infrared sensor will reduce the screen-to-body ratio or affect the appearance. Therefore, an ultrasonic sensor can be adopted to achieve the function of preventing accidental touch, the setting of ultrasonic sensor will not affect the screen-to-body ratio, and will not affect the appearance.

However, the ultrasonic sensor determines the distance change between the obstacle (e.g., user's face) and the mobile terminal by increase/decrease of the frequency of the acoustic wave, the acoustic wave is susceptible to noise, deviation of determination result may occur.

Figure 1:
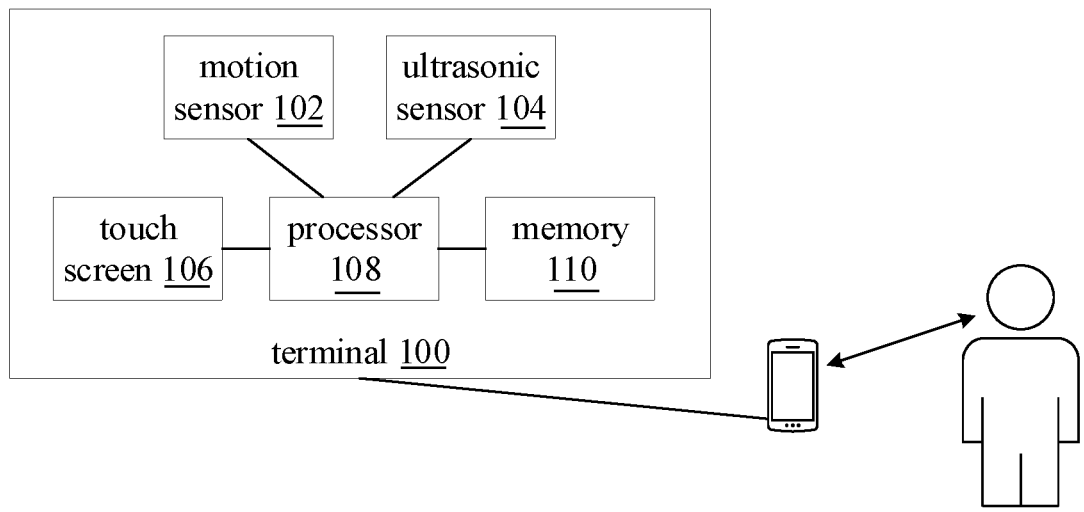
FIG. 1 is a schematic diagram of a terminal according to an embodiment of the present disclosure.

FIG. 1 is a schematic diagram of a terminal according to an embodiment of the present disclosure. The terminal 100 may include at least one of a smart phone, a tablet computer, a notebook computer, a desktop computer, a smart watch, or a portable media player. The terminal 100 may include a motion sensor 102, an ultrasonic sensor 104, a touch screen 106, a processor 108, and a memory 110.

The motion sensor 102 is configured to acquire the acceleration and angular velocity when the terminal moves.

The motion sensor 102 may include a gravity acceleration sensor and/or a gyro sensor. The gravity acceleration sensor and the gyro sensor may be independently set, or may be set on a chip (system-on-a-chip, SoC chip) of an integrated circuit. The gravity acceleration sensor is configured to acquire the acceleration and/or angular velocity when the terminal moves, the gyro sensor is configured to acquire the angular velocity when the terminal moves.

In at least one embodiment, the gravity acceleration sensor may include at least one of a three-axis acceleration sensor, a six-axis acceleration sensor, and a nine-axis acceleration sensor.

Figure 2:
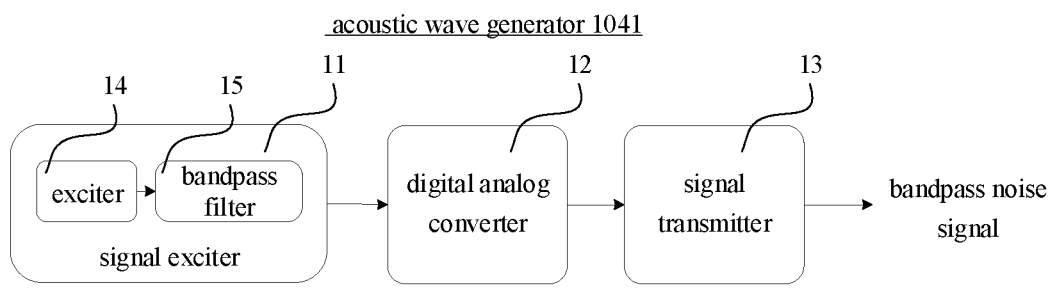
FIG. 2 is a schematic diagram of an acoustic wave generator according to an embodiment of the present disclosure.

The ultrasonic sensor 104 is configured to acquire an audio signal. The ultrasonic sensor 104 may include an acoustic wave generator 1041 and an acoustic wave receiver 1042. The acoustic wave generator 1041 is configured to output the audio signal. FIG. 2 is a schematic diagram of an acoustic wave generator according to an embodiment of the present disclosure, as shown in FIG. 2, the acoustic wave generator 1041 may include a signal exciter 11, a digital analog converter (DAC) 12 and a signal transmitter 13. The signal transmitter 13 may include, but is not limited to, at least one of a horn, a telephone receiver and an ultrasonic transmitter. The signal exciter 11 includes an exciter 14 and a bandpass filter 15. The exciter 14 may be configured to generate a noise signal, the bandpass filter 15 may be configured to filter out the audible wave band and the infrasound wave band from the noise signal, to obtain a bandpass noise signal in the ultrasonic range. The bandpass noise signal can be converted from the digital signal to the analog signal by the DAC 12, and the analog signal can be transmitted externally by the signal transmitter 13.

In at least one embodiment, the exciter 14 may generate any one of the following forms of noise signals: an ultrasonic noise signal, a multi-frequency sinusoidal signal, a combined noise signal of the ultrasonic noise signal and the multi-frequency sinusoidal signal.

Figure 3:
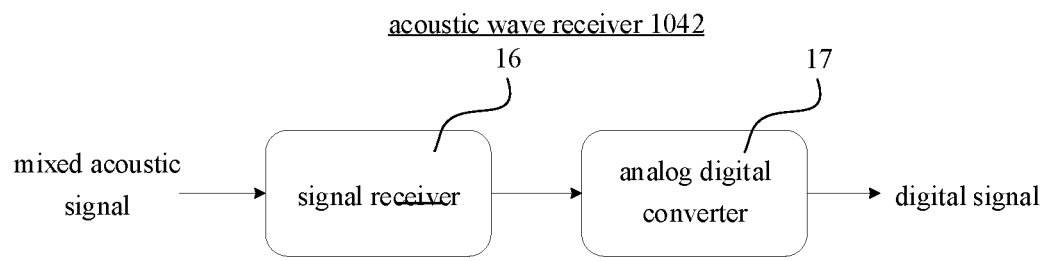
FIG. 3 is a schematic diagram of an acoustic wave receiver according to an embodiment of the present disclosure.

The acoustic wave receiver 1042 is configured to input the audio signal. FIG. 3 is a schematic diagram of an acoustic wave receiver according to an embodiment of the present disclosure, as shown in FIG. 3, the acoustic wave receiver 1042 may include a signal receiver 16 and an analog digital converter (ADC) 17. The signal receiver 16 may include, but is not limited to, a microphone. The signal receiver 16 may receive a mixed acoustic signal of the audio signal transmitted directly to the acoustic wave receiver 1042 from the acoustic wave generator 1041 without reflection, the audio signal transmitted to the acoustic wave receiver 1042 from the acoustic wave generator 1041 after being reflected by an obstacle and the ambient noise. The mixed signal may be converted from the analog signal to the digital signal by the ADC 17, and the digital signal may be input to the processor 108.

In at least one embodiment, the touch screen 106 may include a capacitive touch screen, which is configured to acquire its capacitance changes and the screen area where the capacitance changes occur. The capacitance in the capacitive touch screen may vary with the temperature, humidity etc., when an object approaches the terminal or touches the screen, the temperature and/or humidity around the capacitive touch screen may change, such that the capacitance of the capacitive touch screen may change, the terminal can collect the capacitance change on the capacitive touch screen.

The processor 108 may include one or more processing cores, and can be configured to execute programs stored in the memory 110 to implement the method for recognizing an obstacle according to embodiments of the present disclosure. For example, the processor 108 may recognize the obstacle based on information acquired by the motion sensor 102, the ultrasonic sensor 104 and the touch screen 106.

In at least one embodiment, the processor 108 may further be configured to extract feature information from the acquired acceleration, the angular velocity, the audio signal and the capacitance change, and recognize the obstacle based on the feature information.

The memory 110 is configured to store various types of data to support implementation of the method for recognizing an obstacle according to embodiments of the present disclosure. Examples of such data include instructions for any applications or methods, contact data, phonebook data, messages, pictures, video, etc. The memory 101 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Figure 4:
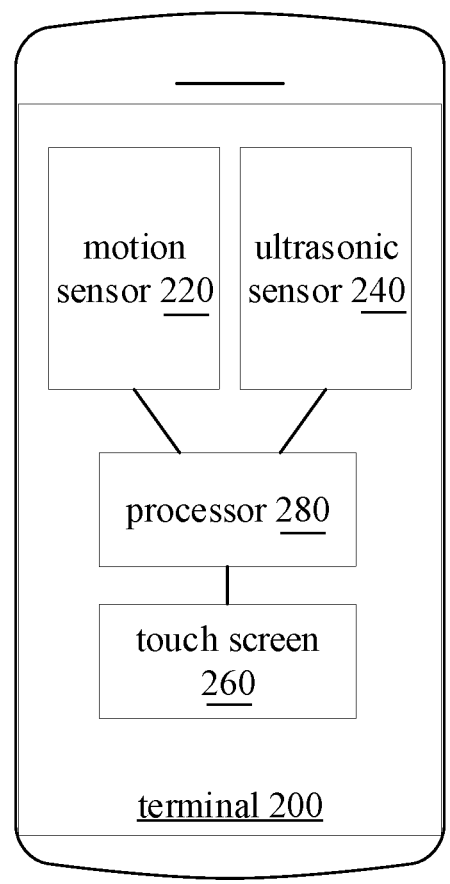
FIG. 4 is a schematic diagram of a terminal according to another embodiment of the present disclosure.

FIG. 4 is a schematic diagram of a terminal 200 according to another embodiment of the present disclosure. The terminal 200 includes a motion sensor 220, an ultrasonic sensor 240, a touch screen 260 and a processor 280. The motion sensor 220, the ultrasonic sensor 240 and the touch screen 260 are electrically coupled to the processor 280, respectively.

The motion sensor 220 is configured to acquire a first dynamic parameter/feature of the terminal at a current moment 200. The ultrasonic sensor 240 is configured to acquire a second dynamic parameter/feature of the terminal at the current moment 200. The processor 280 is configured to perform motion analysis on the obstacle based on the first dynamic parameter and the second dynamic parameter, to obtain an event recognition result of the obstacle.

It should be noted that, in some embodiments, the touch screen 260 may be an optional component, and may be substituted by a general display screen or other display component (such as a projection display device).

In some embodiments, the processor 280 may be configured to input the first dynamic parameter and the second dynamic parameter into a corresponding obstacle recognition model to obtain at least one velocity recognition result and at least one distance recognition result, and determine the event recognition result based on the at least one velocity recognition result and the at least one distance recognition result.

In some embodiments, the processor 280 may be configured to input the first dynamic parameter into a first obstacle recognition model to obtain a first velocity recognition result, and input the second dynamic parameter into a second obstacle recognition model to obtain a second velocity recognition result and a first distance recognition result.

In some embodiments, the processor 280 is configured to: determine an event recognition result of a previous moment as a first recognition result; obtain a second recognition result of the obstacle based on the first velocity recognition result and the second velocity recognition result; determine the second recognition result as the event recognition result when the first velocity recognition result and the second velocity recognition result satisfy a first preset condition; and determine the first recognition result as the event recognition result when the first velocity recognition result and the second velocity recognition result do not satisfy the first preset condition.

In some embodiments, the first velocity recognition result includes any one of an approaching event, a departing event, or an uncertain event, the second velocity recognition result includes any one of the approaching event, the departing event, or the uncertain event.

The processor 280 is configured to determine the second recognition result as the approaching event when the first velocity recognition result and the second velocity recognition result include the approaching event and do not include the far even. The processor 280 is configured to determine the second recognition result as the departing event when the first velocity recognition result and the second velocity recognition result include the departing event and do not include the approaching event. The processor 280 is configured to determine the second recognition result as the uncertain event when the first velocity recognition result and the second velocity recognition result include the departing event and the approaching event, or the first velocity recognition result and the second velocity recognition result are both uncertain events.

In some embodiments, the first distance recognition result includes any one of an approaching event, a departing event, or an uncertain event, the second recognition result includes any one of the approaching event, the departing event, or the uncertain event.

The first preset condition may include: the first distance recognition result including the approaching event and not including the departing event when the second recognition result being the approaching event; and the first distance recognition result including the departing event and not including the approaching event when the second recognition result being the departing event.

In some embodiments, the processor 280 is configured to input the first dynamic parameter and the second dynamic parameter into a third obstacle recognition model to obtain the event recognition result. The third obstacle recognition model is configured to recognize the obstacle, and is obtained by training a neural network model using a historical first dynamic parameter and a historical second dynamic parameter as samples.

In some embodiments, the processor 280 is configured to: extract n first velocity vectors from the first dynamic parameter; extract n second velocity vectors and n first distance vectors from the second dynamic parameter; combine the $i^{th}$ first velocity vector, the $i^{th}$ second velocity vector and the $i^{th}$ first distance vector, to obtain n first vector sets; and input the n first vector sets into the third obstacle recognition model sequentially, to obtain the event recognition result, where i and n are positive integers, and i≤n.

In some embodiments, the third obstacle recognition model includes a three-layer fully connected neural network and an output layer connected in sequence; a multi-recurrent neural network core, a one-layer fully connected neural network and the output layer connected in sequence.

In some embodiments, the terminal also includes a touch screen connected to the processor 280. The processor 280 is configured to acquire a third dynamic parameter of the terminal at a current moment by the touch screen; input the first dynamic parameter, the second dynamic parameter and the third dynamic parameter into a corresponding obstacle recognition model to obtain at least one velocity recognition result and at least one distance recognition result; and determine the event recognition result based on the at least one velocity recognition result and the at least one distance recognition result.

In some embodiments, the processor 280 is configured to input the first dynamic parameter into a first obstacle recognition model to obtain a first velocity recognition result; input the second dynamic parameter into a second obstacle recognition model to obtain a second velocity recognition result and a first distance recognition result; and input the third dynamic parameter into a fourth obstacle recognition model to obtain a second distance recognition result.

In some embodiments, the processor 280 is configured to: determine an event recognition result of a previous moment as a first recognition result; obtain a second recognition result of the obstacle based on the first velocity recognition result and the second velocity recognition result; determine the second recognition result as the event recognition result when the first velocity recognition result and the second velocity recognition result satisfy a second preset condition; and determine the first recognition result as the event recognition result when the first velocity recognition result and the second velocity recognition result do not satisfy the second preset condition.

In some embodiments, the first velocity recognition result includes any one of an approaching event, a departing event, or an uncertain event, the second velocity recognition result includes any one of the approaching event, the departing event, or the uncertain event.

The processor 280 is configured to: determine the second recognition result as the approaching event when the first velocity recognition result and the second velocity recognition result include the approaching event and do not include the departing event; determine the second recognition result as the departing event when the first velocity recognition result and the second velocity recognition result include the departing event and do not include the approaching event; and determine the second recognition result as the uncertain event when the first velocity recognition result and the second velocity recognition result include the departing event and the approaching event, or the first velocity recognition result and the second velocity recognition result are both uncertain events.

In some embodiments, the first distance recognition result includes any one of an approaching event, a departing event, or an uncertain event, the second distance recognition result includes any one of the approaching event, the departing event, or the uncertain event, the second recognition result includes any one of the approaching event, the departing event, or the uncertain event.

The second preset condition includes: the first distance recognition result and the second distance recognition result including the approaching event and not including the departing event when the second recognition result being the approaching event; and the first distance recognition result and the second distance recognition result including the departing event and not including the approaching event when the second recognition result being the departing event.

In some embodiments, the at least one velocity recognition result includes a third velocity recognition result, the at least one distance recognition result includes a third distance recognition result.

The processor 280 is configured to input the first dynamic parameter and the second dynamic parameter into a fifth obstacle recognition model to obtain the third velocity recognition result; and input the second dynamic parameter and the third dynamic parameter into a sixth obstacle recognition model to obtain the third distance recognition result.

In some embodiments, the third velocity recognition result includes any one of an approaching event, a departing event, or an uncertain event, the third distance recognition result includes any one of the approaching event, the departing event, or the uncertain event.

The processor 280 is configured to: determine the event recognition result as the approaching event when the third velocity recognition result and the third distance recognition result include the approaching event and do not include the departing event; determine the event recognition result as the departing event when the third velocity recognition result and the third distance recognition result include the departing event and do not include the approaching event; and determine the event recognition result as the uncertain event when the third velocity recognition result and the third distance recognition result include the approaching event and the departing event, or the third velocity recognition result and the third distance recognition result are both uncertain events.

In some embodiments, the terminal also includes a touch screen connected to the processor 280. The processor 280 is configured to acquire a third dynamic parameter of the terminal at a current moment by the touch screen; and input the first dynamic parameter, the second dynamic parameter and the third dynamic parameter into a seventh obstacle recognition model to obtain the event recognition result. The seventh obstacle recognition model is configured to recognize the obstacle, and is obtained by training a neural network model using a historical first dynamic parameter, a historical second dynamic parameter and a historical third dynamic parameter as samples.

In some embodiments, the processor 280 is configured to: extract n first velocity vectors from the first dynamic parameter; extract n second velocity vectors and n first distance vectors from the second dynamic parameter; extract n second distance vectors from the third dynamic parameter; combine the $i^{th}$ first velocity vector, the $i^{th}$ second velocity vector, the $i^{th}$ first distance vector and the $i^{th}$ second distance vector, to obtain n vector sets; and input the n vector sets into the seventh obstacle recognition model sequentially, to obtain the event recognition result, where i and n are positive integers, and i≤n.

In some embodiments, the seventh obstacle recognition model includes a three-layer fully connected neural network and an output layer connected in sequence; a multi-recurrent neural network core, a one-layer fully connected neural network and the output layer connected in sequence.

As described above, with the terminal for recognizing an obstacle according to embodiments of the present disclosure, the first dynamic parameter of the terminal is acquired by the motion sensor, the second dynamic parameter of the terminal is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the terminal, the state of the obstacle in the direction toward the terminal such as approaching, moving away, or uncertain can be recognized. With the terminal, recognition of the obstacle is realized together by the motion sensor and the ultrasonic sensor, the deviation caused by only using the acoustic wave frequency for obstacle recognition can be corrected, the obstacle recognition accuracy can be improved.

Figure 5:
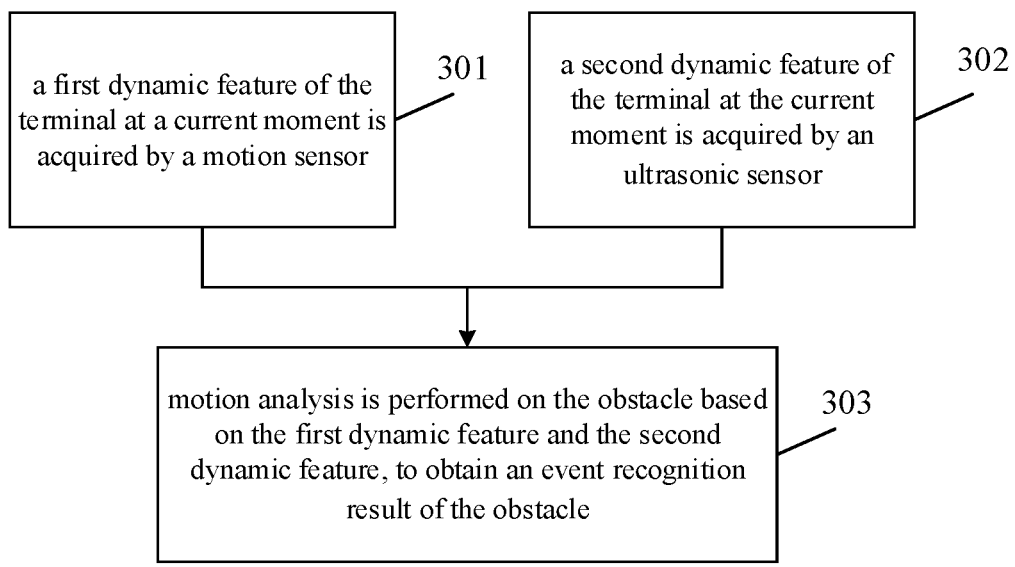
FIG. 5 is a flowchart of a method for recognizing an obstacle according to an embodiment of the present disclosure.

FIG. 5 is a flowchart of a method for recognizing an obstacle according to an embodiment of the present disclosure. By taking the application of the method to the terminal shown in FIG. 1 as an example, the method may include the followings.

At block 301, a first dynamic parameter of the terminal at a current moment is acquired by a motion sensor.

In at least one embodiment, the first dynamic parameter may include at least one of an acceleration, an angular velocity, a linear velocity, and an angle.

In an embodiment, the acceleration includes three-axis acceleration Ax, Ay and Az. A rectangular coordinate system is established in space, including x-axis x, y-axis, and z-axis, the three coordinate axes are perpendicular to each other, Ax represents the acceleration in the x-axis direction, Ay represents the acceleration in the y-axis direction, and Az represents acceleration in the y-axis direction.

The linear velocity includes linear velocities Vx, Vy and Vz. In at least one embodiment, the terminal may integrate the acceleration to obtain the linear velocity, Vx can be obtained by integrating the acceleration Ax in the x-axis direction, and can be expressed as Vx=∫(Ax)dt, Vy can be obtained by integrating the acceleration Ay in the y-axis direction, and can be expressed as Vy=∫(Ay)dt, Vz can be obtained by integrating the acceleration Az in the z-axis direction, and can be expressed as Vz=∫(Az)dt.

The angle includes azimuth and elevation. The azimuth indicates an included angle at which the terminal rotates in a clockwise direction from the north line where the terminal is located, the elevation indicates an included angle at which the terminal rotates in a vertical direction to the ground.

The angular velocity may be a time differential value of the angle. In at least one embodiment, the terminal may differentiate the angle to obtain the time differential value of angle. The time differential value of azimuth may be expressed as d(Azimuth)/dt, and the time differential value of elevation may be expressed as d(Elevation)/dt.

At block 302, a second dynamic parameter of the terminal at the current moment is acquired by an ultrasonic sensor.

In at least one embodiment, the second dynamic parameter may include a frequency domain position difference value and a frequency domain time difference value.

For example, the ultrasonic sensor acquires the audio signal, the terminal can extract the frequency domain position difference value and the frequency domain time difference value from the audio signal. The audio signal is a digital signal.

The extraction process of the frequency domain position difference value may include the followings.

1) Frequency domain conversion is performed on the current frame of the audio signal to obtain a frequency domain signal. The frequency domain signal includes n frequency domain components.

In at least one embodiment, the manner of frequency domain conversion may include, but is not limited to, at least one of a Fourier transform, a cosine transform, a Z transform, or a filter bank.

2) A difference operation is performed on the n frequency domain components and n reference frequency domain components, to obtain n frequency domain position difference values.

In an embodiment, the terminal may perform frequency domain conversion on the audio signal W by frame, to obtain the transformed audio signal F, which may be expressed as:

$$F(1 \ldots n) = FT(W(t=-(n-1) \ldots 0)),$$

where FT indicates the frequency domain conversion.

The power value $F_{pow}$ of the n frequency domain components may be calculated according to the transformed audio signal F, which may be expressed as:

$$F_{pow}(1 \ldots n) = RMS(F(1 \ldots n)),$$

where RMS indicates root mean square.

The terminal may perform a difference operation on the power value $F_{pow}$ of the frequency domain components and the power value $F_{rawpow}$ of the reference frequency domain components to obtain the frequency domain position difference value $F_{posdiff}$, which can be expressed as:

$$F_{posdiff}(1 \ldots n) = F_{rawpow}(1 \ldots n) - F_{pow}(1 \ldots n),$$

where the power value $F_{rawpow}$ denotes to the prerecorded power value of n frequency domain components when no object approaches the terminal, n denotes the frequency domain resolution after frequency domain conversion, and n is a positive integer.

In at least one embodiment, the frequency domain time difference value includes at least one of a first order frequency domain time difference value and a N order frequency domain time difference value, N is a positive integer greater than or equal to 2 (N≥2). The extraction process of frequency domain time difference value may include the followings.

1) Frequency domain conversion is performed on the historical frame and the current frame of the audio signal, to obtain the frequency domain signal. The frequency domain signal of each of the historical frame and the current frame includes n frequency domain components, and n is a positive integer.

In at least one embodiment, the manner of frequency domain conversion may include, but is not limited to, at least one of a Fourier transform, a cosine transform, a Z transform, or a filter bank.

2) A difference operation is performed on n frequency domain components of the $i^{th}$ frame and n frequency domain components of the $(i-1)^{th}$ frame to obtain the first order frequency domain time difference value, and a difference operation is performed on n frequency domain components of the $i^{th}$ frame and n frequency domain components of the $(i-N)^{th}$ frame to obtain the N order frequency domain time difference value.

For example, the terminal may perform frequency domain conversion on the audio signal W by frame, to obtain the transformed audio signal F, which may be expressed as:

$$F(1 \ldots n) = FT(W(t=-(n-1) \ldots 0)).$$

The power value $F_{pow}$ of the n frequency domain components may be calculated according to the transformed audio signal F, which may be expressed as:

$$F_{pow}(1 \ldots n) = RMS(F(1 \ldots n)).$$

The terminal may store the power values $F_{pow}^0 \ldots F_{pow}^{-M}$ of frequency domain components from the current frame to previous M frames, M is a positive integer, and perform a difference operation on the n frequency domain components of the $i^{th}$ frame and the n frequency domain components of the $(i-1)^{th}$ frame to obtain the first order frequency domain time difference value, i is an integer, i≤0. The first order frequency domain time difference value of the $i^{th}$ frame may be expressed as:

$$F_{timediff}^1 = F_{pow}(t=i) - F_{pow}(t=i-1).$$

The terminal may perform a difference operation on the n frequency domain components of the $i^{th}$ frame and the n frequency domain components of the $(i-N)^{th}$ frame to obtain the N order frequency domain time difference value, N is a positive integer, N≤M+i. The N order frequency domain time difference value of the $i^{th}$ frame may be expressed as:

$$F_{timediff}^N = F_{pow}(t=i) - F_{pow}(t=i-N).$$

When i=0, it denotes the first order frequency domain time difference value $F_{timediff}^1$ and the N order frequency domain time difference value $F_{timediff}^N$ of the current frame.

At block 303, motion analysis is performed on the obstacle based on the first dynamic parameter and the second dynamic parameter, to obtain an event recognition result of the obstacle.

In at least one embodiment, the terminal may perform motion analysis on the obstacle based on at least one of the acceleration, the angular velocity, the linear velocity, the angle, the frequency domain position difference value, or the frequency domain time difference value, to obtain the event recognition result of the obstacle.

In at least one embodiment, the event recognition result may include any one of an approaching event, a departing event, or an uncertain (no action) event.

As described above, with the method for recognizing an obstacle according to embodiments of the present disclosure, the first dynamic parameter of the terminal at the current moment is acquired by the motion sensor, the second dynamic parameter of the terminal at the current moment is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the method, the state of the obstacle in the direction toward the terminal such as approaching, moving away and uncertain can be recognized. With the method, recognition of the obstacle is realized together by the motion sensor and the ultrasonic sensor, the deviation caused by only using the acoustic wave frequency for obstacle recognition can be corrected, the obstacle recognition accuracy can be improved.

On the basis of FIG. 5, the method for the terminal to recognize the obstacle according to the first dynamic parameter and the second dynamic parameter may include the following two cases.

In an embodiment, the terminal may be provided with two obstacle recognition models to recognize the obstacle according to the first dynamic parameter and the second dynamic parameter, respectively, and the recognition result of the two obstacle recognition models is analyzed to determine the event recognition result.

In another embodiment, the terminal may be provided with one obstacle recognition model, and the first dynamic parameter and the second dynamic parameter are input to the obstacle recognition model, to obtain the event recognition result.

Figure 6:
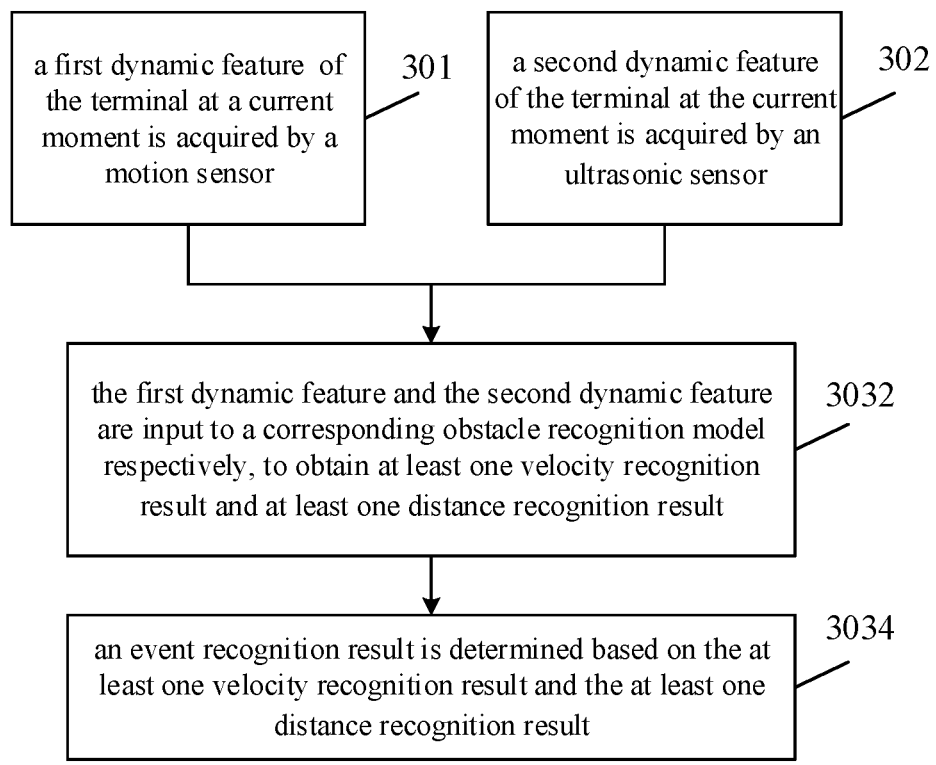
FIG. 6 is a flowchart of a method for recognizing an obstacle according to another embodiment of the present disclosure.

FIG. 6 is a flowchart of a method for recognizing an obstacle according to another embodiment of the present disclosure, on the basis of FIG. 5, block 303 may include blocks 3032 to 3034, and the method may include followings.

At block 3032, the first dynamic parameter and the second dynamic parameter are input to a corresponding obstacle recognition model respectively, to obtain at least one velocity recognition result and at least one distance recognition result.

In at least one embodiment, when the terminal is provided with two obstacle recognition models, the at least one velocity recognition result may include a first velocity recognition result and a second velocity recognition result, the at least one distance recognition result may include a first distance recognition result.

The exemplary steps for the terminal to obtain the velocity recognition result and distance recognition result may include the followings.

1) The terminal inputs the first dynamic parameter into the first obstacle recognition model, to obtain the first velocity recognition result.

In at least one embodiment, the first obstacle recognition model may be a neural network model, and the neural network model may be obtained by training historical first dynamic parameter.

In at least one embodiment, the neural network model may include at least one of perceptron, convolutional neural networks (CNN), deconvolutional networks (DN), recurrent neural networks (RNN), long/short term memory (LSTM) networks, hopfield networks (HN), Boltzmann machine (BM) networks, deep belief networks (DBN), and auto encoder (AE).

In at least one embodiment, the first velocity recognition result may include any one of an approaching event, a departing event, or an uncertain (no action) event.

2) The terminal inputs the second dynamic parameter to the second obstacle recognition model, to obtain the second velocity recognition result and the first distance recognition result.

In at least one embodiment, the second obstacle recognition model may be a neural network model, and the neural network model may be obtained by training the historical second dynamic parameter.

In at least one embodiment, the second velocity recognition result may include any one of an approaching event, a departing event, or an uncertain (no action) event. The first distance recognition result may include any one of an approaching event, a departing event, or an uncertain (no action) event.

In at least one embodiment, at the first moment when the terminal performs obstacle recognition, the exemplary steps for the second obstacle recognition model to obtain the first distance recognition result may include the followings.

a) A relative distance between the terminal and the obstacle is calculated.

b) It is determined whether the relative distance is less than a distance threshold. When the relative distance is less than the distance threshold, the second distance recognition result is determined as the approaching event, when the relative distance is greater than or equal to the distance threshold, the second distance recognition result is determined as the departing event, and when there is no relative distance, the second distance recognition result is determined as the uncertain (no action) event.

At block 3034, the event recognition result is determined based on the at least one velocity recognition result and the at least one distance recognition result.

In at least one embodiment, when the terminal is provided with two obstacle recognition models, the process for the terminal performing the motion analysis may include the following steps.

1) An event recognition result of a previous moment is determined as a first recognition result.

In at least one embodiment, the first recognition result may include any one of an approaching event, a departing event, or an uncertain (no action) event.

For example, when the current moment is $(k+1)^{th}$ moment, the previous moment is $k^{th}$ moment, k is a positive integer.

2) A second recognition result of the obstacle is obtained by analyzing the first velocity recognition result and the second velocity recognition result.

In at least one embodiment, the second recognition result may include any one of an approaching event, a departing event, or an uncertain (no action) event.

In at least one embodiment, the second recognition result is determined as the approaching event when the first velocity recognition result and the second velocity recognition result include the approaching event and do not include the far even.

For example, the above step may be expressed by a set V_near:

$$V\_near=(US\_velocity\_near \| IMU\_velocity\_near);$$

where US_velocity_near indicates that the second velocity recognition result is the approaching event, IMU_velocity_near indicates that the first velocity recognition result is the approaching event, (US_velocity_near∥IMU_velocity_near) indicates that the first velocity recognition result is the approaching event and the second velocity recognition result is the uncertain event, or the first velocity recognition result is the uncertain event and the second velocity recognition result is the approaching event, or the first velocity recognition result and the second velocity recognition result are both approaching events.

When the first velocity recognition result and the second velocity recognition result include the departing event and do not include the approaching event, the second recognition result is determined as the departing event.

For example, the above step may be expressed by a set V_far:

$$V\_far=(US\_velocity\_far \| IMU\_velocity\_far);$$

US_velocity_far indicates that the second velocity recognition result is the departing event, IMU_velocity_far indicates that the first velocity recognition result is the departing event, (US_velocity_far∥IMU_velocity_far) indicates that the first velocity recognition result is the departing event and the second velocity recognition result is the uncertain event, or the first velocity recognition result is the uncertain event and the second velocity recognition result is the departing event, or the first velocity recognition result and the second velocity recognition result are both departing events.

When the first velocity recognition result and the second velocity recognition result include the departing event and the approaching event, or the first velocity recognition result and the second velocity recognition result are both uncertain events, the second recognition result is determined as the uncertain event.

For example, when the first velocity recognition result and the second velocity recognition result are both uncertain events, or the first velocity recognition result is the approaching event and the second velocity recognition result is the departing event, or the first velocity recognition result is the departing event and the second velocity recognition result is the approaching event, the terminal can determine the second recognition result as the uncertain event.

3) When the first velocity recognition result and the second velocity recognition result satisfy a first preset condition, the second recognition result is determined as the event recognition result, and when the first velocity recognition result and the second velocity recognition result do not satisfy the first preset condition, the first recognition result is determined as the event recognition result.

In at least one embodiment, the first preset condition may include that the first distance recognition result is the approaching event when the second recognition result is the approaching event, and that the first distance recognition result is the departing event when the second recognition result is the departing event.

In other words, when the second recognition result is the approaching event, and the first distance recognition result is also the approaching event, the terminal may determine the event recognition result as the approaching event, when the second recognition result is the departing event, and the first distance recognition result is also the departing event, the terminal may determine the event recognition result as the departing event, otherwise, the terminal may determine the first recognition result as the event recognition result.

As described above, with the method for recognizing an obstacle according to embodiments of the present disclosure, the first dynamic parameter of the terminal at the current moment is acquired by the motion sensor, the second dynamic parameter of the terminal at the current moment is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the method, the state of the obstacle in the direction toward the terminal such as approaching, moving away and uncertain can be recognized. With the method, recognition of the obstacle is realized together by the motion sensor and the ultrasonic sensor, the deviation caused by only using the acoustic wave frequency for obstacle recognition can be corrected, the obstacle recognition accuracy can be improved.

Figure 7:
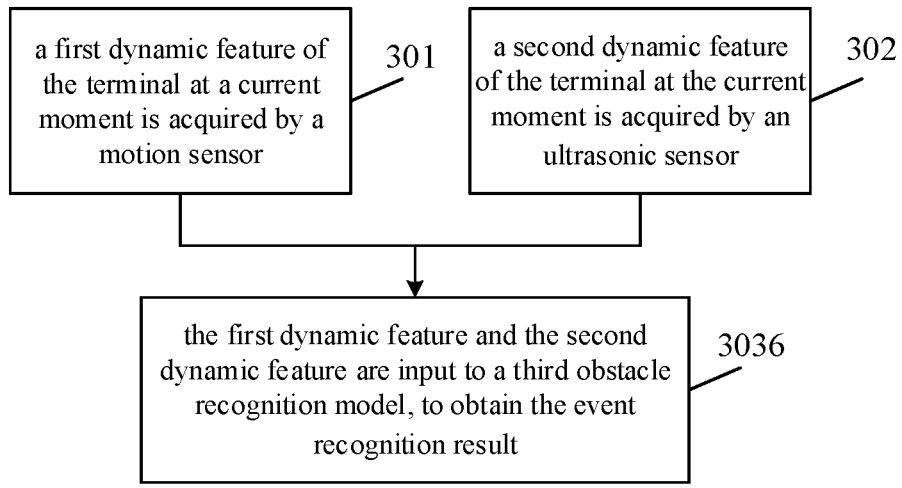
FIG. 7 is a flowchart of a method for recognizing an obstacle according to another embodiment of the present disclosure.

FIG. 7 is a flowchart of a method for recognizing an obstacle according to another embodiment of the present disclosure, on the basis of FIG. 5, block 303 may include block 3036, and the method may include followings.

At block 3036, the first dynamic parameter and the second dynamic parameter are input to a third obstacle recognition model, to obtain the event recognition result.

In at least one embodiment, the third obstacle recognition model is configured to recognize the obstacle, and may be obtained by training the neural network model using the historical first dynamic parameter and the historical second dynamic parameter as samples.

In at least one embodiment, the neural network model may include a three-layer fully connected neural network and an output layer connected in sequence, a multi-recurrent neural network core, a one-layer fully connected neural network and the output layer connected in sequence.

Figure 8:
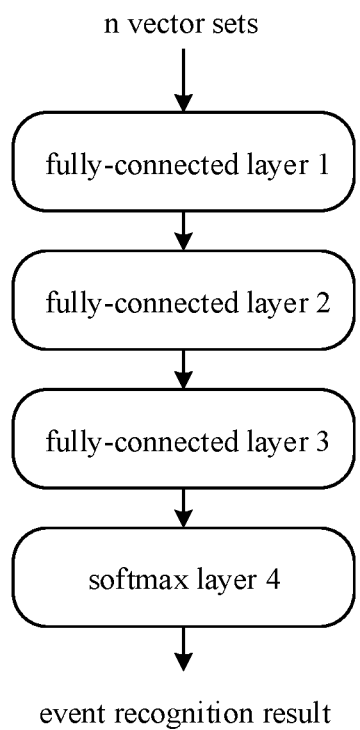
FIG. 8 is a schematic diagram of an obstacle recognition model according to an embodiment of the present disclosure.

When the third obstacle recognition model includes the three-layer fully connected neural network connected in sequence and the output layer, as shown in FIG. 8, which is a schematic diagram of an obstacle recognition model according to an embodiment of the present disclosure, the three-layer fully-connected neural network may include a fully-connected layer 1, a fully-connected layer 2 and a fully-connected layer 3, the output layer is the softmax layer 4.

Figure 9:
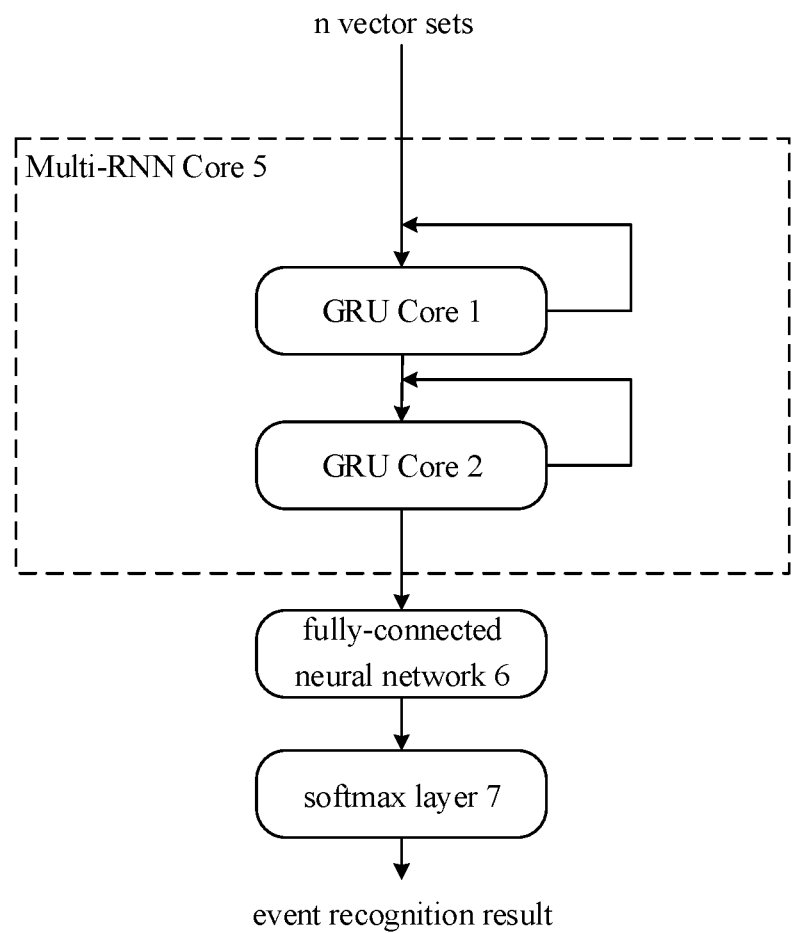
FIG. 9 is a schematic diagram of an obstacle recognition model according to another embodiment of the present disclosure.

When the third obstacle recognition model includes the multi-recurrent neural network core, one layer fully-connected neural network and the output layer connected in sequence, as shown in FIG. 9, the multi-recurrent neural network core (multi-RNN core) 5 includes a gated recurrent unit core (GRU core) 1 and a GRU core 2, the one-layer fully-connected neural network is the fully-connected neural network 6, and the output layer is the softmax layer 7.

In at least one embodiment, the process for the terminal performing obstacle recognition through the third obstacle recognition model may include the following steps.

1) n first velocity vectors are extracted from the first dynamic parameter.

2) n second velocity vectors and n first distance vectors are extracted from the second dynamic parameter.

3) The $i^{th}$ first velocity vector, the $i^{th}$ second velocity vector and the $i^{th}$ first distance vector are combined to obtain n first vector sets.

4) The n first vector sets are input into the third obstacle recognition model sequentially, to obtain the event recognition result.

For example, the terminal may sequentially input the n first vector sets into the third obstacle recognition model, to obtain the event recognition result.

As described above, with the method for recognizing an obstacle according to embodiments of the present disclosure, the first dynamic parameter of the terminal at the current moment is acquired by the motion sensor, the second dynamic parameter of the terminal at the current moment is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the method, the state of the obstacle in the direction toward the terminal such as approaching, moving away and uncertain can be recognized. With the method, recognition of the obstacle is realized together by the motion sensor and the ultrasonic sensor, the deviation caused by only using the acoustic wave frequency for obstacle recognition can be corrected, the obstacle recognition accuracy can be improved.

On the basis of FIG. 5, the terminal may perform obstacle recognition by the motion sensor, the ultrasonic sensor and a touch screen. The method may include the following two circumstances.

In an embodiment, the terminal is provided with at least two obstacle recognition models, and obstacle recognition is performed based on the at least two obstacle recognition models.

In another embodiment, the terminal is provided with one obstacle recognition model, and obstacle recognition is performed based on the obstacle recognition model.

Figure 10:
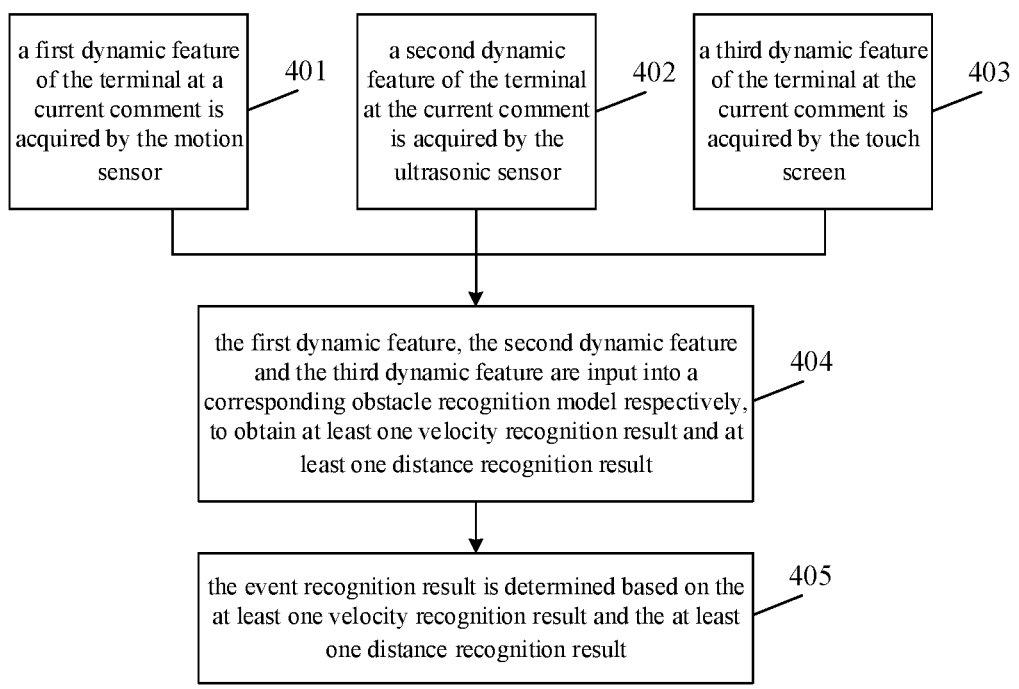
FIG. 10 is a flowchart of a method for recognizing an obstacle according to another embodiment of the present disclosure.

FIG. 10 is a flowchart of a method for recognizing an obstacle according to another embodiment of the present disclosure, by taking the application of the method to the terminal shown in FIG. 1 as an example, the method may include the followings.

At block 401, a first dynamic parameter of the terminal at a current moment is acquired by the motion sensor.

At block 402, a second dynamic parameter of the terminal at the current moment is acquired by the ultrasonic sensor.

At block 403, a third dynamic parameter of the terminal at the current moment is acquired by the touch screen.

In at least one embodiment, the third dynamic parameter may include a capacitance, a time difference value of the capacitance, and an area value of the capacitance.

For example, the capacitance C may denote the capacitance value generated on the touch screen due to the change of temperature and/or humidity. The time difference value of the capacitance may denote the capacitance change value between $j^{th}$ moment and $(j-1)^{th}$ moment, and can be expressed as: $C_{timediff}=C(t=j)-C(t=j-1)$. The area value of the capacitance may denote the screen area on the touch screen generating the capacitance.

At block 404, the first dynamic parameter, the second dynamic parameter and the third dynamic parameter are input into a corresponding obstacle recognition model respectively, to obtain at least one velocity recognition result and at least one distance recognition result.

In at least one embodiment, when the terminal is provided three obstacle recognition models, the at least one velocity recognition result may include a first velocity recognition result and a second velocity recognition result, the at least one distance recognition result may include a first distance recognition result and a second distance recognition result.

The exemplary steps for the terminal to obtain the velocity recognition result and the distance recognition result may include followings.

1) The terminal inputs the first dynamic parameter into the first obstacle recognition model to obtain the first velocity recognition result.

2) The terminal inputs the second dynamic parameter into the second obstacle recognition model, to obtain the second velocity recognition result and the first distance recognition result.

3) The terminal inputs the third dynamic parameter into the fourth obstacle recognition model, to obtain the second distance recognition result.

In at least one embodiment, the fourth obstacle recognition model may be a neural network model, and the neural network model may be obtained by training the historical third dynamic parameter.

In at least one embodiment, the second distance recognition result may include any one of an approaching event, a departing event, or an uncertain (no action) event.

In at least one embodiment, when the terminal is provided with two obstacle recognition models, the at least one velocity recognition result includes a third velocity recognition result, the at least one distance recognition result includes a third distance recognition result.

The exemplary steps for the terminal to obtain the velocity recognition result and the distance recognition result may include the followings.

1) The first dynamic parameter and the second dynamic parameter are input into a fifth obstacle recognition model, to obtain the third velocity recognition result.

In at least one embodiment, the fifth obstacle recognition model may be a neural network model, and the neural network model may be obtained by training the historical first dynamic parameter and the historical second dynamic parameter.

In at least one embodiment, the third velocity recognition result may include any one of an approaching event, a departing event, or an uncertain (no action) event.

2) The second dynamic parameter and the third dynamic parameter are input into a sixth obstacle recognition model to obtain the third distance recognition result.

In at least one embodiment, the sixth obstacle recognition model may be a neural network model, and the neural network model may be obtained by training the historical second dynamic parameter and the historical third dynamic parameter acquired.

In at least one embodiment, the third distance recognition result may include any one of an approaching event, a departing event, or an uncertain (no action) event.

At block 405, the event recognition result is determined based on the at least one velocity recognition result and the at least one distance recognition result.

In at least one embodiment, when the terminal is provided with three obstacle recognition models, the process for the terminal performing the motion analysis on the obstacle may include the following steps.

1) An event recognition result of a previous moment is determined as a first recognition result.

2) A second recognition result of the obstacle is obtained by analyzing the first velocity recognition result and the second velocity recognition result.

3) When the first velocity recognition result and the second velocity recognition result satisfy a second preset condition, the second recognition result is determined as the event recognition result, and when the first velocity recognition result and the second velocity recognition result do not satisfy the second preset condition, the first recognition result is determined as the event recognition result.

In at least one embodiment, the second preset condition may include that the first distance recognition result and the second distance recognition result including the approaching event and not including the departing event when the second recognition result being the approaching event, and the first distance recognition result and the second distance recognition result including the departing event and not including the approaching event when the second recognition result being the departing event.

For example, it can be expressed by a set D_near that the first distance recognition result and the second distance recognition result include the approaching event and do not include the departing event:

$$D\_near=(US\_distance\_near\|TP\_distance\_near);$$

US_distance_near indicates that the first distance recognition result is the approaching event; TP_distance_near indicates that the second distance recognition result is the approaching event; (US_distance_near‖ TP_distance_near) indicates that the first distance recognition result is the approaching event and the second distance recognition result is the uncertain event, or the first distance recognition result is the uncertain event and the second distance recognition result is the approaching event, or the first distance recognition result and the second distance recognition result are both approaching events.

It can be expressed by a set D_far that the first distance recognition result and the second distance recognition result include the approaching event and do not include the departing event:

$$D\_far=(US\_distance\_far\|TP\_distance\_far);$$

US_distance_far indicates that the first distance recognition result is the departing event; TP_distance_far indicates that the second distance recognition result is the departing event; (US_distance_far‖ TP_distance_far) indicates that the first distance recognition result is the departing event and the second distance recognition result is the uncertain event, or the first distance recognition result is the uncertain event and the second distance recognition result is the departing event, or the first distance recognition result and the second distance recognition result are both departing events.

In other words, when the second recognition result is the approaching event, and the first distance recognition result and the second distance recognition result include the approaching event and do not include the departing event, the terminal may determine the event recognition result as the approaching event, when the second recognition result is the departing event, and the first distance recognition result and the second distance recognition result include the departing event and do not include the approaching event, the terminal may determine the event recognition result as the departing event, otherwise, the terminal may determine the first recognition result as the event recognition result.

For example, the comprehensive recognition logic of the obstacle may be described with the following pseudocode.

```
initial output = (US_distance < threshold) ? near : far // US_distance indicates the
relative distance between the terminal and the obstacle, threshold indicates the distance
threshold, it is determined whether the relative distance is less than the distance threshold,
when the relative distance is less than the distance threshold, the first recognition result is
determined as the approaching event, when the relative distance is greater than or equal to the
distance threshold, the first recognition result is determined as the departing event, and when
there is no relative distance, the first recognition result is determined as the uncertain (no
action) event.
V_near = (US_velocity_near || IMU_velocity_near) // it is determined whether the
second recognition result is the approaching event.
  if (V_near) {
    D_near = (US_distance_near || TP_distance_near) // when the second
recognition result is the approaching event, it is determined whether the first distance
recognition result and the second distance recognition result include the approaching event
and do not include the departing event.
    if (D_near)
      output = near // if the first distance recognition result and the
second distance recognition result include the approaching event and do not include the
departing event, the event recognition result is determined as the approaching event.
    else
      output = previous; // otherwise, the first recognition result is
determined as the event recognition result.
  } else if (V_far) {
    D_far = (US_distance_far || TP_distance_far) // when the second
recognition result is the departing event, it is determined whether the first distance recognition
result and the second distance recognition result include the departing event and do not
include the approaching event.
    if (D_far)
      output = far // if the first distance recognition result and the
second distance recognition result include the departing event and do not include the
approaching event, the event recognition result is determined as the departing event.
    else
      output = previous; // otherwise, the first recognition result is
determined as the event recognition result.
  } else
    output = previous. // when the second recognition result is the uncertain
event, the first recognition result is determined as the event recognition result.
```

In at least one embodiment, when the terminal is provided with two obstacle recognition models, the process for the terminal to perform motion analysis on the obstacle may include the following steps.

1) When the third velocity recognition result and the third distance recognition result include the approaching event and do not include the departing event, the event recognition result is determined as the approaching event.

For example, the above step may be expressed by a set C_near:

C_near=(VEL_near||DIS_near);

VEL_near indicates that the third velocity recognition result is the approaching event; DIS_near indicates that the third distance recognition result is the approaching event; (VEL_near|| DIS_near) indicates that the third velocity recognition result is the approaching event and the third distance recognition result is the uncertain event, or the third velocity recognition result is the uncertain event and the third distance recognition result is the approaching event, or the third velocity recognition result and the third distance recognition result are both approaching events.

2) When the third velocity recognition result and the third distance recognition result include the departing event and do not include approaching event, the event recognition result is determined as the departing event.

For example, the above step may be expressed by a set C_far:

C_far=(VEL_far||DIS_far);

VEL_far indicates that the third velocity recognition result is the departing event; DIS_far indicates that the third distance recognition result is the departing event; (VEL_far||DIS_far) indicates that the third velocity recognition result is the departing event and the third distance recognition result is the uncertain event, or the third velocity recognition result is the uncertain event and the third distance recognition result is the departing event, or the third velocity recognition result and the third distance recognition result are both departing events.

3) When the third velocity recognition result and the third distance recognition result include the approaching event and the departing event, or the third velocity recognition result and the third distance recognition result are both uncertain events, the event recognition result is determined as the uncertain event.

In an embodiment, there may be two cases that the third velocity recognition result and the third distance recognition result include the approaching event and the departing event. For example, the third velocity recognition result is the approaching event, and the third distance recognition result is the departing event. For example, the third velocity recognition result is the departing event, and the third distance recognition result is the approaching event.

As described above, with the method for recognizing an obstacle according to embodiments of the present disclosure, the first dynamic parameter of the terminal at the current moment is acquired by the motion sensor, the second dynamic parameter of the terminal at the current moment is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the method, the state of the obstacle in the direction toward the terminal such as approaching, moving away and uncertain can be recognized. With the method, recognition of the obstacle is realized together by the motion sensor and the ultrasonic sensor, the deviation caused by only using the acoustic wave frequency for obstacle recognition can be corrected, the obstacle recognition accuracy can be improved.

Figure 11:
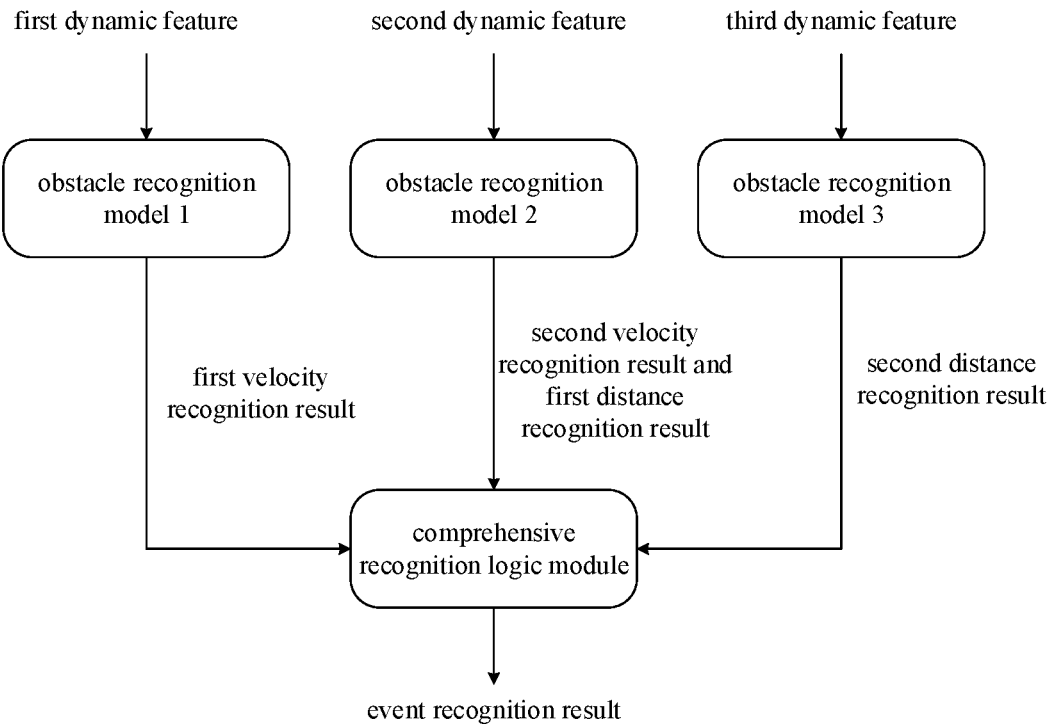
FIG. 11 is a flowchart of a method for recognizing an obstacle according to another embodiment of the present disclosure.

It should be noted that, when there is provided with three obstacle recognition models, the overall framework of the method for recognizing an obstacle according to the embodiment of the present disclosure can be illustrated in FIG. 11, in a flowchart of a method for recognizing an obstacle according to another embodiment of the present disclosure. As shown in FIG. 11, the terminal is provided with four modules, including an obstacle recognition model 1, an obstacle recognition model 2, an obstacle recognition model 3, and a comprehensive recognition logic module 4. The terminal may input the first dynamic parameter into the obstacle recognition model 1 to obtain the first velocity recognition result, input the second dynamic parameter into the obstacle recognition model 2 to obtain the second velocity recognition result and the first distance recognition result, input the third dynamic parameter into the obstacle recognition model 3 to obtain the second distance recognition result, and input the first velocity recognition result, the second velocity recognition result, the first distance recognition result and the second distance recognition result into the comprehensive recognition logic module 4 to obtain the event recognition result.

Figure 12:
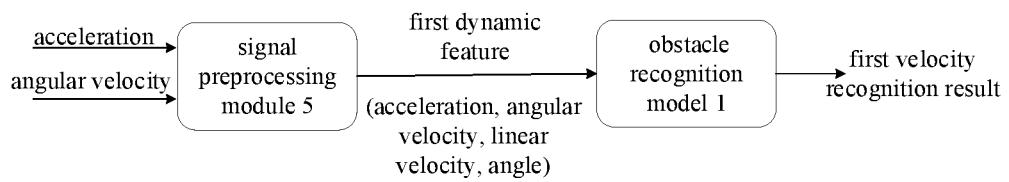
FIG. 12 is a flowchart of a method for recognizing an obstacle according to another embodiment of the present disclosure.

Before the dynamic parameter is inputted into the obstacle recognition model, the raw data acquired by the sensor needs to be processed. By taking the processing of the raw data acquired by the motion sensor as an example, as shown in FIG. 12, which is a flowchart of a method for recognizing an obstacle according to another embodiment of the present disclosure, the terminal may acquire the acceleration and the angular velocity by the motion sensor, the terminal may also include a signal preprocessing module 5, and by inputting the acceleration and the angular velocity into the signal preprocessing module 5, the first dynamic parameter can be obtained. The first dynamic parameter may include the acceleration, the angular velocity, the linear velocity, and the angle. The linear velocity is obtained based on the acceleration, the angle is obtained based on the angular velocity. Then, the terminal may input the first dynamic parameter into the obstacle recognition model 1 to obtain the first velocity recognition result.

Figure 13:
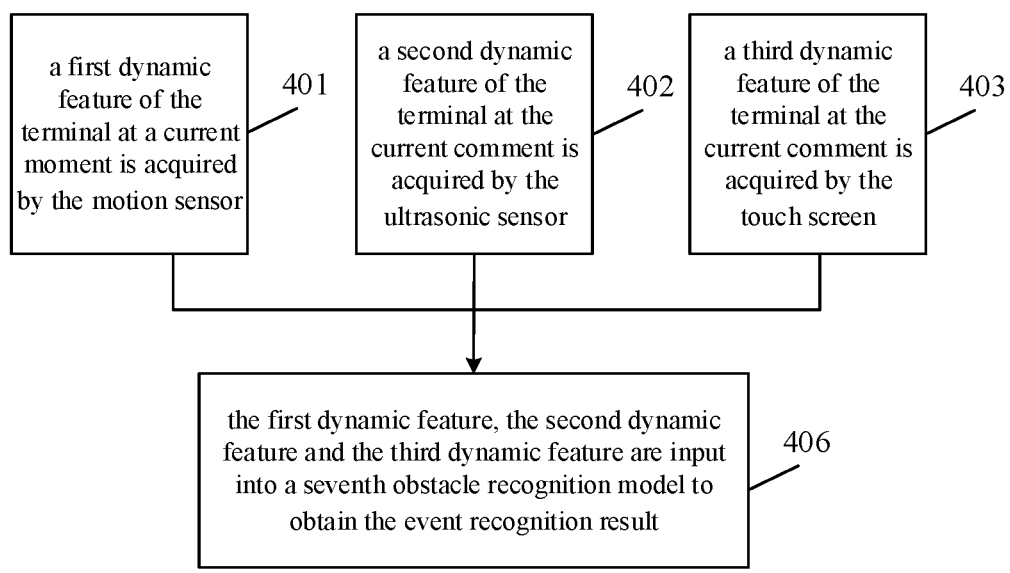
FIG. 13 is a flowchart of a method for recognizing an obstacle according to another embodiment of the present disclosure.

FIG. 13 is a flowchart of a method for recognizing an obstacle according to another embodiment of the present disclosure, on the basis of FIG. 10, the method may include the following operations.

At block 406, the first dynamic parameter, the second dynamic parameter and the third dynamic parameter are input into a seventh obstacle recognition model to obtain the event recognition result.

In at least one embodiment, the seventh obstacle recognition model is configured for obstacle recognition, and may be obtained by training the neural network model using the historical first dynamic parameter, the historical second dynamic parameter and the historical third dynamic parameter as samples.

In at least one embodiment, the neural network model may include a three-layer fully connected neural network and an output layer connected in sequence, a multi-recurrent neural network core, a one-layer fully connected neural network and the output layer connected in sequence.

In at least one embodiment, the process for the terminal performing obstacle recognition through the seventh obstacle recognition model may include the following steps.

1) n first velocity vectors are extracted from the first dynamic parameter.

2) n second velocity vectors and n first distance vectors are extracted from the second dynamic parameter.

3) n second distance vectors are extracted from the third dynamic parameter.

4) the $i^{th}$ first velocity vector, the $i^{th}$ second velocity vector, the $i^{th}$ first distance vector and the $i^{th}$ second distance vector are combined, to obtain n vector sets.

5) the n vector sets are input into the seventh obstacle recognition model sequentially, to obtain the event recognition result.

For example, the terminal may sequentially input the n vector sets into the seventh obstacle recognition model to obtain the event recognition result.

As described above, with the method for recognizing an obstacle according to embodiments of the present disclosure, the first dynamic parameter of the terminal at the current moment is acquired by the motion sensor, the second dynamic parameter of the terminal at the current moment is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the method, the state of the obstacle in the direction toward the terminal such as approaching, moving away and uncertain can be recognized. With the method, recognition of the obstacle is realized together by the motion sensor and the ultrasonic sensor, the deviation caused by only using the acoustic wave frequency for obstacle recognition can be corrected, the obstacle recognition accuracy can be improved.

Figure 14:
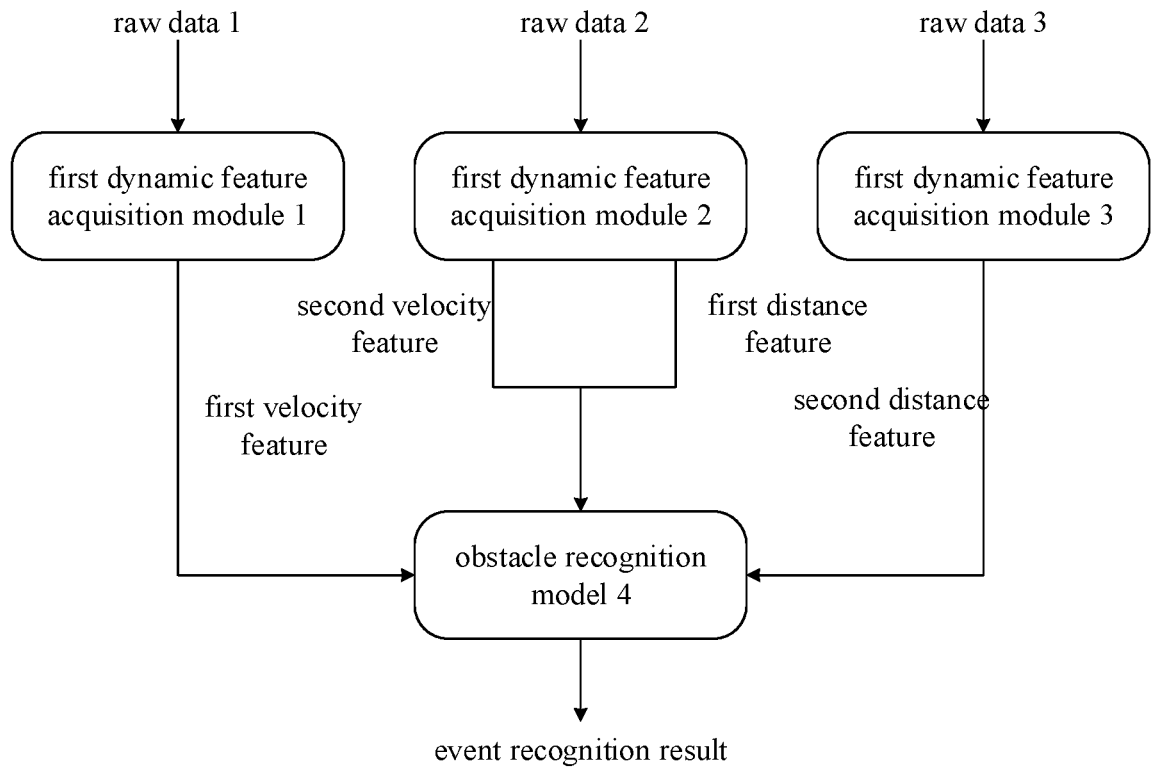
FIG. 14 is a flowchart of a method for recognizing an obstacle according to yet another embodiment of the present disclosure.

It should be noted that, the overall framework of the method for recognizing an obstacle according to the embodiment of the present disclosure may be illustrated in FIG. 14, which is a flowchart of a method for recognizing an obstacle according to another embodiment of the present disclosure. As shown in FIG. 14, the terminal is provided with four modules, including a first dynamic parameter/feature acquisition module 1, a second dynamic parameter/feature acquisition module 2, a third dynamic parameter/feature acquisition module 3, and an obstacle recognition model 4. The terminal may input raw data 1 acquired by the motion sensor into the first dynamic parameter/feature acquisition module 1 to obtain a first velocity feature, input raw data 2 acquired by the ultrasonic sensor into the second dynamic parameter/ feature acquisition module 2 to obtain a second velocity feature and a first distance feature, input raw data 3 acquired by the touch screen into the third dynamic parameter/feature acquisition module 3 to obtain a second distance feature, and input the first velocity feature, the second velocity feature, the first distance feature and the second distance feature into the obstacle recognition model 4 to obtain the event recognition result.

Figure 15:
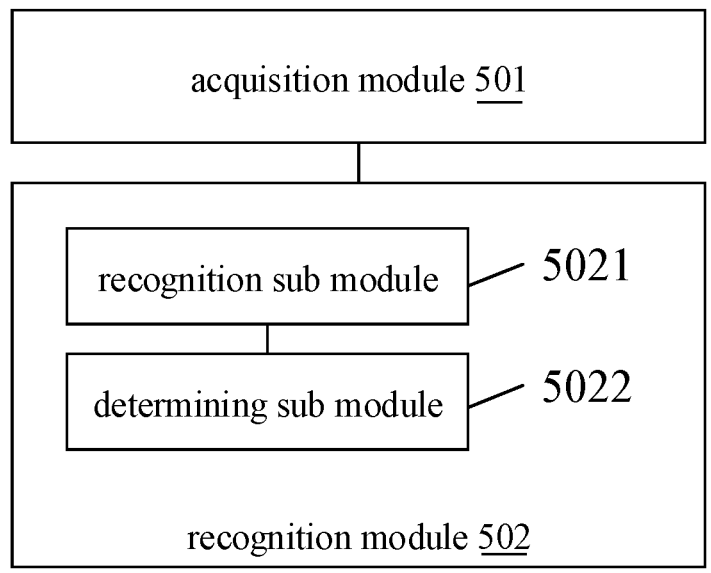
FIG. 15 is a block diagram of a device for recognizing an obstacle according to an embodiment of the present disclosure.

FIG. 15 is a block diagram of a device for recognizing an obstacle according to an embodiment of the present disclosure. The device may be implemented as all or part of an electronic device by software, hardware or a combination of both, and the device may be provided with a motion sensor, an ultrasonic sensor and a touch screen (optional). As shown in FIG. 15, the device may include an acquisition module 501 and a recognition module 502.

The acquisition module 501 is configured to acquire a first dynamic parameter of the terminal by the motion sensor, and acquire a second dynamic parameter of the terminal by the ultrasonic sensor. The recognition module 502 is configured to perform motion analysis on the obstacle based on the first dynamic parameter and the second dynamic parameter to obtain an event recognition result of the obstacle.

In some embodiments, the recognition module 502 includes a recognition sub module 5021 and a determining sub module 5022. The recognition sub module 5021 is configured to input the first dynamic parameter and the second dynamic parameter into a corresponding obstacle recognition model respectively, to obtain at least one velocity recognition result and at least one distance recognition result. The determining sub module 5022 is configured to determine the event recognition result based on the at least one velocity recognition result and the at least one distance recognition result.

In some embodiments, the at least one velocity recognition result includes a first velocity recognition result and a second velocity recognition result, the at least one distance recognition result includes a first distance recognition result. The recognition sub module 5021 is configured to input the first dynamic parameter into a first obstacle recognition model to obtain the first velocity recognition result, and input the second dynamic parameter into a second obstacle recognition model to obtain the second velocity recognition result and the first distance recognition result.

In some embodiments, the determining sub module 5022 is configured to: determine an event recognition result of a previous moment as a first recognition result; obtain a second recognition result of the obstacle based on the first velocity recognition result and the second velocity recognition result; determine the second recognition result as the event recognition result when the first velocity recognition result and the second velocity recognition result satisfy a first preset condition; and determine the first recognition result as the event recognition result when the first velocity recognition result and the second velocity recognition result do not satisfy the first preset condition.

In some embodiments, the first velocity recognition result includes any one of an approaching event, a departing event, or an uncertain event, the second velocity recognition result includes any one of the approaching event, the departing event, or the uncertain event.

The determining sub module 5022 is configured to: determine the second recognition result as the approaching event when the first velocity recognition result and the second velocity recognition result include the approaching event and do not include the far even; determine the second recognition result as the departing event when the first velocity recognition result and the second velocity recognition result include the departing event and do not include the approaching event; and determine the second recognition result as the uncertain event when the first velocity recognition result and the second velocity recognition result include the departing event and the approaching event, or the first velocity recognition result and the second velocity recognition result are both uncertain events.

In some embodiments, the first distance recognition result includes any one of an approaching event, a departing event, or an uncertain event, the second recognition result includes any one of the approaching event, the departing event, or the uncertain event.

The first preset condition may include: the first distance recognition result including the approaching event and not including the departing event when the second recognition result being the approaching event; and the first distance recognition result including the departing event and not including the approaching event when the second recognition result being the departing event.

The recognition sub module 5021 is configured to input the first dynamic parameter and the second dynamic parameter into a third obstacle recognition model to obtain the event recognition result. The third obstacle recognition model is configured to recognize the obstacle, and is obtained by training a neural network model using a historical first dynamic parameter and a historical second dynamic parameter as samples.

The recognition sub module 5021 is configured to: extract n first velocity vectors from the first dynamic parameter; extract n second velocity vectors and n first distance vectors from the second dynamic parameter; combine the $i^{th}$ first velocity vector, the $i^{th}$ second velocity vector and the $i^{th}$ first distance vector, to obtain n first vector sets; and input the n first vector sets into the third obstacle recognition model sequentially, to obtain the event recognition result, where i and n are positive integers, and $i \leq n$.

In some embodiments, the third obstacle recognition model includes a three-layer fully connected neural network and an output layer connected in sequence; a multi-recurrent neural network core, a one-layer fully connected neural network and the output layer connected in sequence.

In combination with the module structures showed in FIG. 15, in another embodiment, the acquisition module 501 is configured to: acquire a first dynamic parameter of the terminal by the motion sensor; acquire a second dynamic parameter of the terminal by the ultrasonic sensor; and acquire a third dynamic parameter of the terminal by the touch screen. The recognition module 502 is configured to perform motion analysis on the obstacle based on the first dynamic parameter, the second dynamic parameter and the third dynamic parameter to obtain the event recognition result of the obstacle.

In some embodiments, the recognition sub module 5021 is configured to input the first dynamic parameter, the second dynamic parameter and the third dynamic parameter into a corresponding obstacle recognition model respectively, to obtain at least one velocity recognition result and at least one distance recognition result. The determining sub module 5022 is configured to determine the event recognition result based on the at least one velocity recognition result and the at least one distance recognition result.

In some embodiments, the at least one velocity recognition result includes a first velocity recognition result and a second velocity recognition result, the at least one distance recognition result includes a first distance recognition result and a second distance recognition result. The recognition sub module 5021 is configured to input the first dynamic parameter into a first obstacle recognition model to obtain the first velocity recognition result; input the second dynamic parameter into a second obstacle recognition model to obtain the second velocity recognition result and the first distance recognition result; and input the third dynamic parameter into a fourth obstacle recognition model to obtain the second distance recognition result.

In some embodiments, the determining sub module 5022 is configured to: determine an event recognition result of a previous moment as a first recognition result; obtain a second recognition result of the obstacle based on the first velocity recognition result and the second velocity recognition result; determine the second recognition result as the event recognition result when the first velocity recognition result and the second velocity recognition result satisfy a second preset condition; and determine the first recognition result as the event recognition result when the first velocity recognition result and the second velocity recognition result do not satisfy the second preset condition.

In some embodiments, the first velocity recognition result includes any one of an approaching event, a departing event, or an uncertain event, the second velocity recognition result includes any one of the approaching event, the departing event, or the uncertain event.

The determining sub module 5022 is configured to: determine the second recognition result as the approaching event when the first velocity recognition result and the second velocity recognition result include the approaching event and do not include the departing event; determine the second recognition result as the departing event when the first velocity recognition result and the second velocity recognition result include the departing event and do not include the approaching event; and determine the second recognition result as the uncertain event when the first velocity recognition result and the second velocity recognition result include the departing event and the approaching event, or the first velocity recognition result and the second velocity recognition result are both uncertain events.

In some embodiments, the first distance recognition result includes any one of an approaching event, a departing event, or an uncertain event, the second distance recognition result includes any one of the approaching event, the departing event, or the uncertain event, the second recognition result includes any one of the approaching event, the departing event, or the uncertain event. The second preset condition includes: the first distance recognition result and the second distance recognition result including the approaching event and not including the departing event when the second recognition result being the approaching event; and the first distance recognition result and the second distance recognition result including the departing event and not including the approaching event when the second recognition result being the departing event.

In some embodiments, the at least one velocity recognition result includes a third velocity recognition result, the at least one distance recognition result includes a third distance recognition result. The recognition sub module 5021 is configured to input the first dynamic parameter and the second dynamic parameter into a fifth obstacle recognition model to obtain the third velocity recognition result; and input the second dynamic parameter and the third dynamic parameter into a sixth obstacle recognition model to obtain the third distance recognition result.

In some embodiments, the third velocity recognition result includes any one of an approaching event, a departing event, or an uncertain event, the third distance recognition result includes any one of the approaching event, the departing event, or the uncertain event.

The determining sub module 5022 is configured to: determine the event recognition result as the approaching event when the third velocity recognition result and the third distance recognition result include the approaching event and do not include the departing event; determine the event recognition result as the departing event when the third velocity recognition result and the third distance recognition result include the departing event and do not include the approaching event; and determine the event recognition result as the uncertain event when the third velocity recognition result and the third distance recognition result include the approaching event and the departing event, or the third velocity recognition result and the third distance recognition result are both uncertain events.

In some embodiments, the recognition sub module 5021 is configured to input the first dynamic parameter, the second dynamic parameter and the third dynamic parameter into a seventh obstacle recognition model to obtain the event recognition result. The seventh obstacle recognition model is configured to recognize the obstacle, and is obtained by training a neural network model using historical first dynamic parameter, historical second dynamic parameter and historical third dynamic parameter as samples.

In some embodiments, the recognition sub module 5021 is configured to: extract n first velocity vectors from the first dynamic parameter; extract n second velocity vectors and n first distance vectors from the second dynamic parameter; extract n second distance vectors from the third dynamic parameter; combine the $i^{th}$ first velocity vector, the $i^{th}$ second velocity vector, the $i^{th}$ first distance vector and the $i^{th}$ second distance vector, to obtain n vector sets; and input the n vector sets into the seventh obstacle recognition model sequentially, to obtain the event recognition result, where i and n are positive integers, and i≤n.

The various device components, circuits, modules, units, blocks, or portions may have modular configurations, or are composed of discrete components, but nonetheless may be referred to as "modules" in general. In other words, the "components," "circuits," "modules," "units," "blocks," or "portions" referred to herein may or may not be in modular forms.

In some embodiments, the seventh obstacle recognition model includes a three-layer fully connected neural network and an output layer connected in sequence; a multi-recurrent neural network core, a one-layer fully connected neural network and the output layer connected in sequence.

As described above, with the device for recognizing an obstacle according to embodiments of the present disclosure, the first dynamic parameter of the terminal is acquired by the motion sensor, the second dynamic parameter of the terminal is acquired by the ultrasonic sensor, and motion of the obstacle is analyzed based on the first dynamic parameter and the second dynamic parameter to obtain the event recognition result of the obstacle. The event recognition result may include any one of the approaching event, the departing event, or the uncertain event. Through the terminal, the state of the obstacle in the direction toward the terminal such as approaching, moving away, or uncertain can be recognized. With the terminal, recognition of the obstacle is realized together by the motion sensor and the ultrasonic sensor, the deviation caused by only using the acoustic wave frequency for obstacle recognition can be corrected, the obstacle recognition accuracy can be improved.

Embodiments of the present disclosure further provide a non-transitory computer-readable storage medium. The computer-readable storage medium stores at least one instruction, at least one program, a code set or an instruction set. When the at least one instruction, the at least one program, the code set or the instruction set are loaded and executed by a processor, causes the method for recognizing an obstacle according to embodiments of the present disclosure to be implemented.

Figure 16:
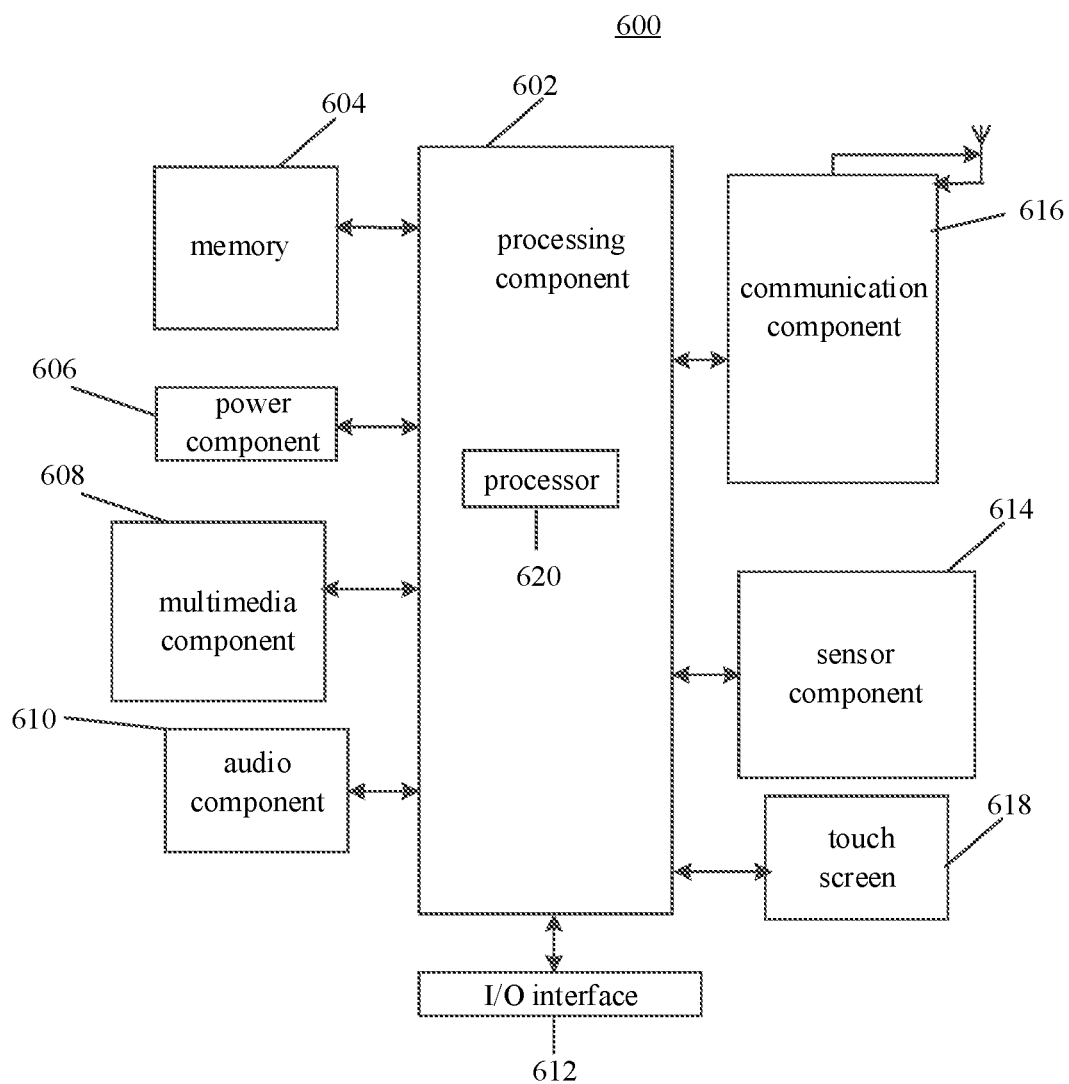
FIG. 16 is a block diagram of a device for recognizing an obstacle according to another embodiment of the present disclosure.

FIG. 16 is a block diagram of a device for recognizing an obstacle according to another embodiment of the present disclosure. For example, the device 600 may be a mobile phone, a computer, a digital broadcasting terminal, a message transceiver device, a game control console, a tablet device, a medical device, a fitness facility, or a personal digital assistant etc.

With reference to FIG. 16, the device 600 may include one or more of the following components: a processing component 602, a memory 604, a power component 606, a multimedia component 608, an audio component 610, an input/output (I/O) interface 612, a sensor component 614, a communication component 616, and a touch screen 618.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front-facing camera and/or a rear-facing camera. When the device 600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyro sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as Wi-Fi, 2G, 3G, 4G, or 5G, or a combination thereof. In one exemplary embodiment, the communication component 616 receives a broadcast signal or broadcast associated information from an external broadcast management system via a broadcast channel.

The touch screen 618 is configured to receive a control instruction triggered on the screen, and report it to the processor to cause the processor to execute the control instruction. In at least one embodiment, the touch screen 618 may include at least one of a resistive touch screen and a capacitive touch screen.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the user equipment 600, for performing the above-described methods. For example, the non-transitory computer-readable storage medium may be a ROM, a RAM, a CD-ROM, a magnetic tape, a floppy disc, an optical data storage device, and the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or applications (APP) can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game cons ole, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A terminal configured to recognize an obstacle, comprising: a motion sensor, an ultrasonic sensor, and a processor; wherein:
    the motion sensor and the ultrasonic sensor are electrically coupled to the processor;
    the motion sensor is configured to acquire a first dynamic parameter of the terminal;
    the ultrasonic sensor is configured to acquire a second dynamic parameter of the terminal; and the processor is configured to:
perform motion analysis on the obstacle based on the first dynamic parameter and the second dynamic parameter, to obtain an event recognition result of the obstacle;
input the first dynamic parameter into a first obstacle recognition model, to obtain a first velocity recognition result of at least one velocity recognition result;
input the second dynamic parameter into a second obstacle recognition model, to obtain a second velocity recognition result of the at least one velocity recognition result and a first distance recognition result of at least one distance recognition result;
determine an event recognition result of a previous moment as a first recognition result;
obtain a second recognition result of the obstacle based on the first velocity recognition result and the second velocity recognition result;
determine the second recognition result as the event recognition result when the first velocity recognition result and the second velocity recognition result satisfy a first preset condition; and
determine the first recognition result as the event recognition result when the first velocity recognition result and the second velocity recognition result do not satisfy the first preset condition.

2. The terminal according to claim 1, wherein the first velocity recognition result comprises any one of an approaching event, a departing event, or an uncertain event, the second velocity recognition result comprises any one of the approaching event, the departing event, or the uncertain event;
the processor is configured to:
determine the second recognition result as the approaching event when the first velocity recognition result and the second velocity recognition result comprise the approaching event and do not comprise the departing event;
determine the second recognition result as the departing event when the first velocity recognition result and the second velocity recognition result comprise the departing event and do not comprise the approaching event; and
determine the second recognition result as the uncertain event when the first velocity recognition result and the second velocity recognition result comprise the departing event and the approaching event, or the first velocity recognition result and the second velocity recognition result are both uncertain events.

3. The terminal according to claim 1, wherein the first distance recognition result comprises any one of an approaching event, a departing event, or an uncertain event, the second recognition result comprises any one of the approaching event, the departing event, or the uncertain event;
the first preset condition comprises: the first distance recognition result comprising the approaching event and not comprising the departing event when the second recognition result being the approaching event; and the first distance recognition result comprising the departing event and not comprising the approaching event when the second recognition result being the departing event.

4. The terminal according to claim 1, wherein the processor is configured to:
input the first dynamic parameter and the second dynamic parameter into a third obstacle recognition model, to obtain the event recognition result;
wherein the third obstacle recognition model is configured to recognize the obstacle, and is obtained by training a neural network model using a historical first dynamic parameter and a historical second dynamic parameter as samples.

5. The terminal according to claim 4, wherein the processor is configured to:
extract n first velocity vectors from the first dynamic parameter;
extract n second velocity vectors and n first distance vectors from the second dynamic parameter;
combine the $i^{th}$ first velocity vector, the $i^{th}$ second velocity vector and the $i^{th}$ first distance vector, to obtain n first vector sets; and
input the n first vector sets into the third obstacle recognition model sequentially, to obtain the event recognition result, where i and n are positive integers, and i≤n.

6. The terminal according to claim 4, wherein the third obstacle recognition model comprises:
a three-layer fully connected neural network and an output layer connected in sequence; or
a multi-recurrent neural network core, a one-layer fully connected neural network and the output layer connected in sequence.

7. The terminal according to claim 1, wherein the terminal further comprises a touch screen coupled to the processor;
the processor is configured to:
acquire a third dynamic parameter of the terminal at a current moment by the touch screen;
input the first dynamic parameter, the second dynamic parameter and the third dynamic parameter into a corresponding obstacle recognition model, to obtain the at least one velocity recognition result and the at least one distance recognition result; and
determine the event recognition result based on the at least one velocity recognition result and the at least one distance recognition result.

8. The terminal according to claim 7, wherein the processor is configured to:
input the first dynamic parameter into the first obstacle recognition model, to obtain the first velocity recognition result;
input the second dynamic parameter into the second obstacle recognition model, to obtain the second velocity recognition result and the first distance recognition result; and
input the third dynamic parameter into a fourth obstacle recognition model, to obtain a second distance recognition result of the at least one distance recognition result.

9. The terminal according to claim 8, wherein the processor is configured to:
determine the event recognition result of a previous moment as the first recognition result;
obtain the second recognition result of the obstacle based on the first velocity recognition result and the second velocity recognition result;
determine the second recognition result as the event recognition result when the first velocity recognition result and the second velocity recognition result satisfy a second preset condition; and
determine the first recognition result as the event recognition result when the first velocity recognition result and the second velocity recognition result do not satisfy the second preset condition.

10. The terminal according to claim 9, wherein the first velocity recognition result comprises any one of an approaching event, a departing event, or an uncertain event, the second velocity recognition result comprises any one of the approaching event, the departing event, or the uncertain event;

the processor is configured to:
determine the second recognition result as the approaching event when the first velocity recognition result and the second velocity recognition result comprise the approaching event and do not comprise the departing event;
determine the second recognition result as the departing event when the first velocity recognition result and the second velocity recognition result comprise the departing event and do not comprise the approaching event;
determine the second recognition result as the uncertain event when the first velocity recognition result and the second velocity recognition result comprise the departing event and the approaching event, or the first velocity recognition result and the second velocity recognition result are both uncertain events.

11. The terminal according to claim 9, wherein the first distance recognition result comprises any one of an approaching event, a departing event, or an uncertain event, the second distance recognition result comprises any one of the approaching event, the departing event, or the uncertain event, the second recognition result comprises any one of the approaching event, the departing event, or the uncertain event;

the second preset condition comprises: the first distance recognition result and the second distance recognition result comprising the approaching event and not comprising the departing event when the second recognition result being the approaching event; and the first distance recognition result and the second distance recognition result comprising the departing event and not comprising the approaching event when the second recognition result being the departing event.

12. The terminal according to claim 7, wherein the seventh obstacle recognition model comprises at least one of:
a three-layer fully connected neural network and an output layer connected in sequence; or
a multi-recurrent neural network core, a one-layer fully connected neural network and the output layer connected in sequence;
wherein the terminal is a mobile phone configured to realize recognition of the obstacle collectively with the motion sensor and the ultrasonic sensor, correct deviation caused by noise over the ultrasonic sensor, thereby improving obstacle recognition accuracy.

13. The terminal according to claim 1, wherein the at least one velocity recognition result further comprises a third velocity recognition result, the at least one distance recognition result further comprises a third distance recognition result;
the processor is configured to:
input the first dynamic parameter and the second dynamic parameter into a fifth obstacle recognition model to obtain the third velocity recognition result; and
input the second dynamic parameter and a third dynamic parameter into a sixth obstacle recognition model to obtain the third distance recognition result.

14. The terminal according to claim 13, wherein the third velocity recognition result comprises any one of an approaching event, a departing event, or an uncertain event, the third distance recognition result comprises any one of the approaching event, the departing event, or the uncertain event;

the processor is configured to:
determine the event recognition result as the approaching event when the third velocity recognition result and the third distance recognition result comprise the approaching event and do not comprise the departing event;
determine the event recognition result as the departing event when the third velocity recognition result and the third distance recognition result comprise the departing event and do not comprise the approaching event; and
determine the event recognition result as the uncertain event when the third velocity recognition result and the third distance recognition result comprise the approaching event and the departing event, or the third velocity recognition result and the third distance recognition result are both uncertain events.

15. The terminal according to claim 1, wherein the terminal further comprises a touch screen coupled to the processor;
the processor is configured to:
acquire a third dynamic parameter of the terminal at a current moment by the touch screen; and
input the first dynamic parameter, the second dynamic parameter and the third dynamic parameter into a seventh obstacle recognition model, to obtain the event recognition result, wherein the seventh obstacle recognition model is configured to recognize the obstacle, and is obtained by training a neural network model using a historical first dynamic parameter, a historical second dynamic parameter and a historical third dynamic parameter as samples.

16. The terminal according to claim 15, wherein the processor is configured to:
extract n first velocity vectors from the first dynamic parameter;
extract n second velocity vectors and n first distance vectors from the second dynamic parameter;
extract n second distance vectors from the third dynamic parameter;
combine the $i^{th}$ first velocity vector, the $i^{th}$ second velocity vector, the $i^{th}$ first distance vector and the $i^{th}$ second distance vector, to obtain n vector sets; and
input the n vector sets into the seventh obstacle recognition model sequentially, to obtain the event recognition result, where i and n are positive integers, and i≤n.

17. A method for recognizing an obstacle, comprising:
acquiring a first dynamic parameter of a terminal at a current moment;
acquiring a second dynamic parameter of the terminal at the current moment;
performing motion analysis on the obstacle based on the first dynamic parameter and the second dynamic parameter, to obtain an event recognition result of the obstacle;
inputting the first dynamic parameter into a first obstacle recognition model, to obtain a first velocity recognition result of at least one velocity recognition result;
inputting the second dynamic parameter into a second obstacle recognition model, to obtain a second velocity recognition result of the at least one velocity recognition result and a first distance recognition result of at least one distance recognition result;
determining an event recognition result of a previous moment as a first recognition result;

obtaining a second recognition result of the obstacle based on the first velocity recognition result and the second velocity recognition result;

determining the second recognition result as the event recognition result when the first velocity recognition result and the second velocity recognition result satisfy a first preset condition; and determining the first recognition result as the event recognition result when the first velocity recognition result and the second velocity recognition result do not satisfy the first preset condition.

\* \* \* \* \*